US008705073B2

(12) United States Patent
Suzuki et al.

(10) Patent No.: US 8,705,073 B2
(45) Date of Patent: Apr. 22, 2014

(54) DENSITY DETECTION APPARATUS AND METHOD AND IMAGE FORMING APPARATUS

(75) Inventors: Tomohisa Suzuki, Kanagawa (JP); Toru Iwanami, Kanagawa (JP); Makoto Hamatsu, Kanagawa (JP); Wenxiang Ge, Kanagawa (JP); Kenjo Nagata, Kanagawa (JP); Hidefumi Tanaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 17 days.

(21) Appl. No.: 13/555,893

(22) Filed: Jul. 23, 2012

(65) Prior Publication Data

US 2013/0242333 A1 Sep. 19, 2013

(30) Foreign Application Priority Data

Mar. 16, 2012 (JP) ................................ 2012-060797

(51) Int. Cl.
*G06K 15/00* (2006.01)

(52) U.S. Cl.
USPC ............ 358/1.14; 358/1.9; 358/1.2; 358/406; 358/474; 356/445; 399/49

(58) Field of Classification Search
None
See application file for complete search history.

(56) References Cited

U.S. PATENT DOCUMENTS 5,606,395 A * 2/1997 Yang et al. ...................... 399/81
5,887,223 A * 3/1999 Sakai et al. ..................... 399/60
5,991,558 A * 11/1999 Emi et al. ........................ 399/49
6,346,958 B2 * 2/2002 Kanno .......................... 347/116
6,650,441 B1 * 11/2003 Horigome et al. ............ 358/474
6,697,167 B1 * 2/2004 Takahashi ...................... 358/1.9
6,885,473 B2 * 4/2005 Tsuruya ....................... 358/1.18
7,130,082 B2 * 10/2006 Takahashi ...................... 358/2.1
7,251,422 B2 * 7/2007 Tokuyama et al. ............. 399/49
7,426,352 B2 * 9/2008 Moriyama et al. .............. 399/43
7,982,908 B2 * 7/2011 Kita et al. ...................... 358/1.9
8,537,414 B2 * 9/2013 Takatsuka ...................... 358/1.2
2009/0141283 A1 * 6/2009 Tani et al. ..................... 356/445
2013/0201497 A1 * 8/2013 Iwanami et al. ............... 358/1.9
2013/0221205 A1 * 8/2013 Yamasaki et al. ............. 250/216

FOREIGN PATENT DOCUMENTS

JP 2006-017987 A 1/2006

* cited by examiner

*Primary Examiner* — Ashish K Thomas
(74) *Attorney, Agent, or Firm* — Sughrue Mion, PLLC

(57) ABSTRACT

A density detection apparatus includes the following elements. A storage unit stores therein image information. A measuring unit measures amounts of light components reflected by an image carrier or density detection images represented by the image information. A light amount obtaining unit obtains a variation in amounts of light components reflected by each region in which the associated density detection image is formed, and obtains, as a reference value, a representative value of the amounts of light components. An image correcting unit corrects the image information by changing an arrangement order of the density detection images. An image forming unit forms the density detection images on the image carrier on the basis of the corrected image information. A density obtaining unit obtains density levels of density detection images corresponding to their area ratios by using the amounts of light components reflected by the density detection images and the reference values.

13 Claims, 15 Drawing Sheets

FIG. 8

| POSITION NUMBER | ORIGINAL AREA RATIO (%) OF PATCH IMAGE | VARIATION IN REFERENCE VALUES | RANK OF VARIATIONS (ASCENDING ORDER) | AREA RATIOS (%) OF PATCH IMAGES AFTER EXECUTING IMAGE REARRANGEMENT PROCESSING |
|---|---|---|---|---|
| 1 | 0 | 0.52 | 11 | 55.1 |
| 2 | 10.2 | 0.64 | 13 | 65.1 |
| 3 | 15.2 | 1.08 | 18 | 90.0 |
| 4 | 20.2 | 2.13 | 19 | 95.0 |
| 5 | 25.2 | 0.72 | 14 | 70.1 |
| 6 | 30.2 | 0.54 | 12 | 60.1 |
| 7 | 35.2 | 0.12 | 4 | 20.2 |
| 8 | 40.2 | 0.12 | 5 | 25.2 |
| 9 | 45.2 | 0.13 | 6 | 30.2 |
| 10 | 50.1 | 0.14 | 7 | 35.2 |
| 11 | 55.1 | 0.89 | 16 | 80.1 |
| 12 | 60.1 | 2.56 | 20 | 100.0 |
| 13 | 65.1 | 1.04 | 17 | 85.0 |
| 14 | 70.1 | 0.73 | 15 | 75.1 |
| 15 | 75.1 | 0.48 | 10 | 50.1 |
| 16 | 80.1 | 0.08 | 1 | 0 |
| 17 | 85.0 | 0.08 | 2 | 10.2 |
| 18 | 90.0 | 0.09 | 3 | 15.2 |
| 19 | 95.0 | 0.43 | 9 | 45.2 |
| 20 | 100.0 | 0.38 | 8 | 40.2 |

FIG. 11

| POSITION NUMBER | ORIGINAL AREA RATIO (%) OF PATCH IMAGE | VARIATION IN REFERENCE VALUES | RANK OF VARIATIONS (ASCENDING ORDER) | AREA RATIOS (%) OF PATCH IMAGES AFTER EXECUTING IMAGE REARRANGEMENT PROCESSING |
|---|---|---|---|---|
| 1 | 0 | 0.52 | 11 | 80.1 |
| 2 | 10.2 | 0.64 | 13 | 85.0 |
| 3 | 15.2 | 1.08 | 18 | 90.0 |
| 4 | 20.2 | 2.13 | 19 | 35.2 |
| 5 | 25.2 | 0.72 | 14 | 25.2 |
| 6 | 30.2 | 0.54 | 12 | 30.2 |
| 7 | 35.2 | 0.12 | 4 | 20.2 |
| 8 | 40.2 | 0.12 | 5 | 40.2 |
| 9 | 45.2 | 0.13 | 6 | 45.2 |
| 10 | 50.1 | 0.14 | 7 | 50.1 |
| 11 | 55.1 | 0.89 | 16 | 55.1 |
| 12 | 60.1 | 2.56 | 20 | 60.1 |
| 13 | 65.1 | 1.04 | 17 | 65.1 |
| 14 | 70.1 | 0.73 | 15 | 70.1 |
| 15 | 75.1 | 0.48 | 10 | 75.1 |
| 16 | 80.1 | 0.08 | 1 | 0 |
| 17 | 85.0 | 0.08 | 2 | 10.2 |
| 18 | 90.0 | 0.09 | 3 | 15.2 |
| 19 | 95.0 | 0.43 | 9 | 95.0 |
| 20 | 100.0 | 0.38 | 8 | 100.0 |

FIG. 14

| POSITION NUMBER | ORIGINAL AREA RATIO (%) OF PATCH IMAGE | VARIATION IN REFERENCE VALUES | RANK OF VARIATIONS (ASCENDING ORDER) | AREA RATIOS (%) OF PATCH IMAGES AFTER EXECUTING IMAGE REARRANGEMENT PROCESSING |
|---|---|---|---|---|
| 1 | 0 | 0.52 | 11 | 0 |
| 2 | 10.2 | 0.64 | 13 | 10.2 |
| 3 | 15.2 | 1.08 | 18 | 90.0 |
| 4 | 20.2 | 2.13 | 19 | 95.0 |
| 5 | 25.2 | 0.72 | 14 | 25.2 |
| 6 | 30.2 | 0.54 | 12 | 30.2 |
| 7 | 35.2 | 0.12 | 4 | 35.2 |
| 8 | 40.2 | 0.12 | 5 | 40.2 |
| 9 | 45.2 | 0.13 | 6 | 45.2 |
| 10 | 50.1 | 0.14 | 7 | 50.1 |
| 11 | 55.1 | 0.89 | 16 | 55.1 |
| 12 | 60.1 | 2.56 | 20 | 100.0 |
| 13 | 65.1 | 1.04 | 17 | 85.0 |
| 14 | 70.1 | 0.73 | 15 | 70.1 |
| 15 | 75.1 | 0.48 | 10 | 75.1 |
| 16 | 80.1 | 0.08 | 1 | 80.1 |
| 17 | 85.0 | 0.08 | 2 | 65.1 |
| 18 | 90.0 | 0.09 | 3 | 15.2 |
| 19 | 95.0 | 0.43 | 9 | 20.2 |
| 20 | 100.0 | 0.38 | 8 | 60.1 |

DENSITY DETECTION APPARATUS AND METHOD AND IMAGE FORMING APPARATUS

CROSS-REFERENCE TO RELATED APPLICATIONS

This application is based on and claims priority under 35 USC 119 from Japanese Patent Application No. 2012-060797 filed Mar. 16, 2012.

BACKGROUND

Technical Field

The present invention relates to a density detection apparatus and method and an image forming apparatus.

SUMMARY

According to an aspect of the invention, there is provided a density detection apparatus including the following elements. A storage unit stores therein image information concerning plural density detection images having different area ratios and being linearly arranged in a predetermined order. A measuring unit measures amounts of light components reflected by an image carrier or by the plural density detection images formed on the image carrier. A light amount obtaining unit obtains a variation in amounts of light components reflected by each of plural regions in which the plural associated density detection images are formed, on the basis of values of the measured amounts of light components reflected by the image carrier, and obtains, as a reference value, a representative value of the amounts of light components reflected by each of the plural regions. An image correcting unit corrects the image information stored in the storage unit by changing an arrangement order of the plural density detection images so that density detection images having area ratios which are equal to or smaller than a first threshold are to be formed in regions having variations in the amounts of light components which are equal to or smaller than a second threshold. An image forming unit forms the plural density detection images on the image carrier on the basis of the corrected image information. A density obtaining unit obtains image density levels for the plural density detection images corresponding to the area ratios of the plural density detection images by using the amounts of light components reflected by the plural density detection images and the reference values set for the plural regions in which the plural associated density detection images are formed.

BRIEF DESCRIPTION OF THE DRAWINGS

An exemplary embodiment of the present invention will be described in detail based on the following figures, wherein:

FIG. 8 illustrates a table indicating the arrangement order of plural density detection images before and after executing image rearrangement processing;

FIG. 11 illustrates a table indicating the arrangement order of plural density detection images before and after executing image rearrangement processing;

FIG. 14 illustrates a table indicating the arrangement order of plural density detection images before and after executing image rearrangement processing.

DETAILED DESCRIPTION

An exemplary embodiment of the present invention will be described below in detail with reference to the accompanying drawings.

Image Forming Apparatus

An example of the configuration of an image forming apparatus will be discussed below.

The image forming apparatus is an electrophotographic image forming apparatus that forms images on paper by using an electrophotographic developer including toner. In this exemplary embodiment, a so-called tandem, intermediate-transfer image forming apparatus will be described. The image forming apparatus may be of any type as long as it forms density detection images on an image carrier, detects the density levels of the density detection images, and corrects image density levels. The configuration of the image forming apparatus is not restricted to that described in this exemplary embodiment.

Figure 1:
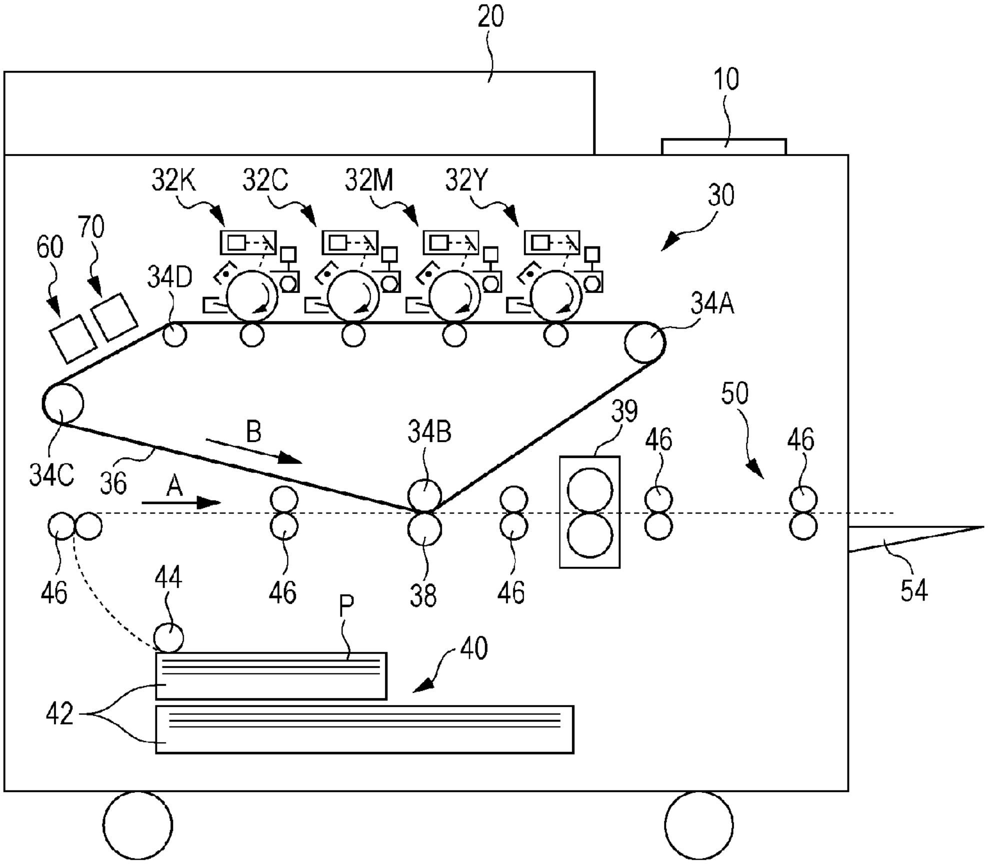
FIG. 1 is a schematic view illustrating an example of the configuration of an image forming apparatus according to an exemplary embodiment of the invention.
Figure 2:
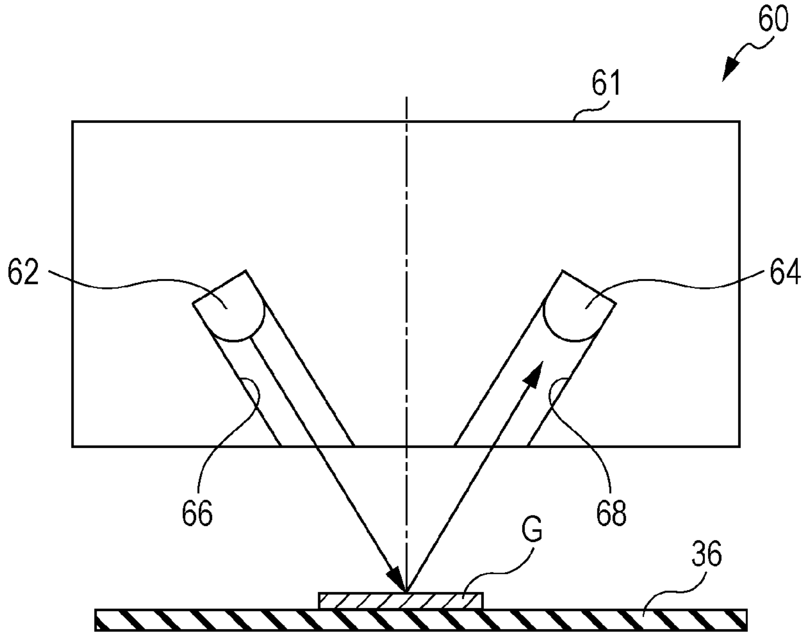
FIG. 2 schematically illustrates an example of the configuration of a light amount detector.
Figure 3:
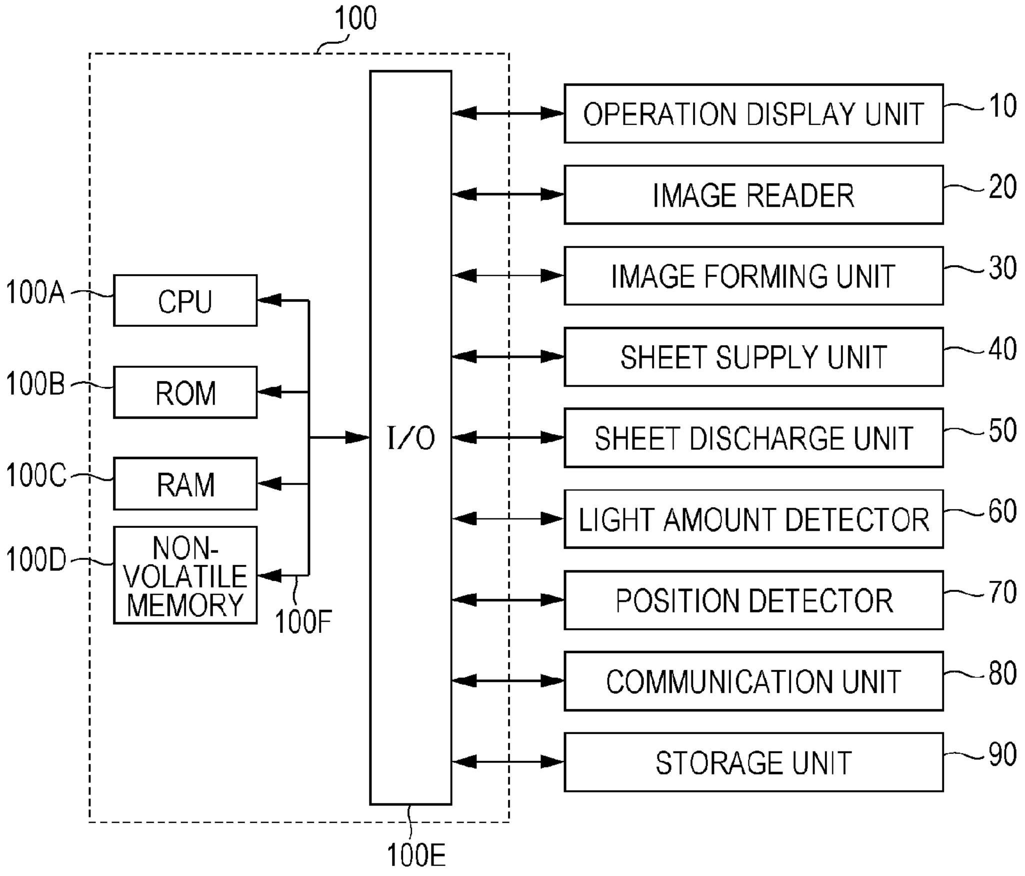
FIG. 3 is a block diagram illustrating the electrical configuration of the image forming apparatus shown in FIG. 1.

FIG. 1 is a schematic view illustrating an example of the configuration of the image forming apparatus according to this exemplary embodiment. FIG. 2 schematically illustrates an example of the configuration of a light amount detector. FIG. 3 is a block diagram illustrating the electrical configuration of the image forming apparatus shown in FIG. 1.

As shown in FIGS. 1 and 3, the image forming apparatus of this exemplary embodiment includes an operation display unit 10, an image reader 20, an image forming unit 30, a sheet supply unit 40, a sheet discharge unit 50, a light amount detector 60, a position detector 70, a communication unit 80, a storage unit 90, and a controller 100. The image forming unit 30, the sheet supply unit 40, and the sheet discharge unit 50 are disposed in the order of the sheet supply unit 40, the image forming unit 30, and the sheet discharge unit 50, along a sheet transport path indicated by the broken line in FIG. 1.

The light amount detector 60 and the position detector 70 are disposed at a position on the exterior side of an image carrier, which forms the image forming unit 30, such that they oppose the image carrier. In this exemplary embodiment, the image carrier is an intermediate transfer belt 36, which will be discussed later. The light amount detector 60 is disposed on the downstream side of an image forming unit 32 with respect to the direction in which the intermediate transfer belt 36 is moved, and measures amounts of light reflected by density detection images which are formed on the intermediate transfer belt 36 by using the image forming unit 30.

The controller 100 is constituted as a computer that controls the entire image forming apparatus and executes various operations. The controller 100 includes a central processing unit (CPU) 100A, a read only memory (ROM) 100B in which various programs are stored, a random access memory (RAM) 100C used as a work area when programs are executed, a non-volatile memory 100D in which various items of information are stored, and an input/output interface (I/O) 100E. The CPU 100A, the ROM 100B, the RAM 100C, the non-volatile memory 100D, and the I/O 100E are connected to one another via a bus 100F.

The operation display unit 10, the image reader 20, the image forming unit 30, the sheet supply unit 40, the sheet discharge unit 50, the light amount detector 60, the position detector 70, the communication unit 80, and the storage unit 90 are connected to the I/O 100E of the controller 100. The controller 100 controls the operation display unit 10, the image reader 20, the image forming unit 30, the sheet supply unit 40, the sheet discharge unit 50, the light amount detector 60, the position detector 70, the communication unit 80, and the storage unit 90.

The controller 100 obtains detection results output from the light amount detector 60 and the position detector 70 as detection signals. The image forming apparatus includes plural transport rollers 46 which are disposed along the sheet transport path indicated by the broken line shown in FIG. 1. The plural transport rollers 46 are driven by a drive mechanism (not shown), and thereby transports a sheet in accordance with an image forming operation.

The operation display unit 10 includes various buttons, such as a start button and a numeric keypad, and a touch panel used for displaying various screens, such as a warning message screen and a setting screen. With this configuration, the operation display unit 10 receives operations performed by a user and displays various items of information for a user. The image reader 20 includes a charge coupled device (CCD) image sensor, an image reading device that optically reads images formed on paper, a scanning mechanism for scanning paper, etc. With this configuration, the image reader 20 reads images formed on a document which is placed on the image reader 20 and then generates image information.

The image forming unit 30 forms images on paper by using an electrophotographic system. The image forming unit 30 includes an image forming unit 32K that forms black (K) toner images, an image forming unit 32C that forms cyan (C) toner images, an image forming unit 32M that forms magenta (M) toner images, and an image forming unit 32Y that forms yellow (Y) toner images. The image forming unit 30 includes the intermediate transfer belt 36, a second transfer device 38, and a fixing device 39. The intermediate transfer belt 36 is wound on plural rollers 34 such that it is moved in the direction indicated by the arrow B in FIG. 1. The second transfer device 38 simultaneously transfers toner images on the intermediate transfer belt 36 onto paper. The fixing device 39 fixes toner images transferred onto paper.

The image forming units 32K, 32C, 32M, and 32Y are disposed in the order shown in FIG. 1 so that a Y toner image, an M toner image, a C toner image, and a K toner image are formed on the intermediate transfer belt 36 in this order when the intermediate transfer belt 36 is moved in the direction indicated by the arrow B in FIG. 1. Hereinafter, the image forming units 32K, 32C, 32M, and 32Y will be simply referred to as "image forming unit 32" or "image forming units 32" unless it is necessary to distinguish between the individual colors. The image forming units 32 each includes a photoconductor drum, a charging device, an exposure device, a developing device, a transfer device, a cleaning device, etc. The photoconductor drums are formed such that they are rotated in the direction indicated by the arrows.

The rollers 34 include a driver roller 34A, a back support roller 34B, a tension application roller 34C, and a driven roller 34D. The intermediate transfer belt 36 is wound on the driver roller 34A, the back support roller 34B, the tension application roller 34C, and the driven roller 34D. Hereinafter, these rollers 34 will be simply referred to as "plural rollers 34" unless it is necessary to distinguish between them. The plural rollers 34 are driven by a drive mechanism (not shown). The drive roller 34A is driven to rotate by the drive mechanism, thereby causing the intermediate transfer belt 36 to move at a predetermined speed in the direction indicated by the arrow B shown in FIG. 1. The tension application roller 34C is moved outward by the drive mechanism, thereby applying a predetermined tension to the intermediate transfer belt 36.

The image forming unit 30 forms images by the following procedure.

The image forming unit 32K transfers a K toner image onto the intermediate transfer belt 36 in the following manner. The charging device charges the photoconductor drum. The exposure device then exposes the charged photoconductor drum to light corresponding to a K image, thereby forming an electrostatic latent image corresponding to the K image on the photoconductor drum. The developing device then develops the electrostatic latent image formed on the photoconductor drum by using a K toner, thereby forming a K toner image. The transfer device transfers the K toner image formed on the photoconductor drum onto the intermediate transfer belt 36.

Similarly, the image forming unit 32C transfers a C toner image onto the intermediate transfer belt 36. The image forming unit 32M transfers an M toner image onto the intermediate transfer belt 36. The image forming unit 32Y transfers a Y toner image onto the intermediate transfer belt 36. The K, C, M, and Y toner images are superposed on one another, thereby forming "superposed toner images". The second transfer device 38 simultaneously transfers the superposed toner images on the intermediate transfer belt 36 onto paper. The fixing device 39 heats and pressurizes the superposed images transferred on paper, thereby fixing the superposed images on paper.

The sheet supply unit 40 includes a sheet housing section 42, a supply mechanism for supplying sheets from the sheet housing section 42 to the image forming unit 30, etc. The supply mechanism includes a feeder roller 44 that feeds sheets from the sheet housing section 42 and transports rollers 46. Plural sheet housing sections 42 are provided in accordance with the types and the sizes of sheets. The sheet supply unit 40 feeds sheets from one of the sheet housing sections 42 and supplies the sheets to the image forming unit 30. The sheet discharge unit 50 includes a discharge section 54 to which sheets are discharged, a discharge mechanism for discharging sheets onto the discharge section 54, etc.

The light amount detector 60 is an optical sensor that irradiates a subject to be detected with detection light and that also detects an amount of light reflected by the subject. A detection signal output from the light amount detector 60 represents an amount of light reflected by the subject. The subject is the intermediate transfer belt 36 on which no density detection image is formed, or a density detection image group G formed on the intermediate transfer belt 36 (see FIG. 4). Details of density correction processing and density detection images will be given later.

As shown in FIG. 2, the light amount detector 60 includes a light emitting element 62 that emits detection light to be applied to a subject and a light receiving element 64 that receives light reflected by the subject. As the light emitting element 62, a light emitting element that emits light in a visible region or in an infrared region, such as a light emitting diode (LED), is used. As the light receiving element 64, a light receiving element having sensitivity to detection light, such as a photodiode (PD), is used. The light emitting element 62 is driven to be lit ON or OFF by a driver (not shown) in accordance with a control signal output from the controller 100. The light receiving element 64 is connected to the controller 100 via an analog-to-digital (A/D) converter (not shown) and outputs a detection signal which is converted to a digital signal by the A/D converter to the controller 100.

The light emitting element 62 and the light receiving element 64 are supported by a support member (not shown) and are housed in a housing 61. In the example shown in FIG. 2, the housing 61 includes an optical waveguide 66 that guides detection light and an optical waveguide 68 that guides reflected light. Detection light emitted from the light emitting element 62 propagates within the optical waveguide 66 and is applied to the density detection image group G formed on the intermediate transfer belt 36. Light reflected by the density detection image group G propagates within the optical waveguide 68 and is received by the light receiving element 64. In this exemplary embodiment, the light emitting element 62 and the light receiving element 64 are disposed such that light obtained as a result of being regularly reflected by the density detection image group G irradiated with detection light is received by the light receiving element 64. That is, the light amount detector 60 is a regular reflection optical sensor.

The position detector 70 is a position sensor that detects a reference mark M (see FIG. 4) attached on the intermediate transfer belt 36 so as to detect a predetermined reference position. When forming an image, the position detector 70 outputs a position detection signal, which serves as a reference to starting an image forming operation. The position detector 70, as well as the light amount detector 60, includes a light emitting element and a light receiving element, and irradiates the intermediate transfer belt 36 with light and also receives light reflected by the surface of the mark M, thereby detecting the position of the intermediate transfer belt 36. In density correction processing, which will be discussed later, various operations are performed on the basis of the position detection signal as a reference to starting an image forming operation.

The communication unit 80 is an interface through which the image forming apparatus communicates with an external apparatus via a wired or wireless communication line. The communication unit 80 receives print parameters including print attributes, such as the number of pages and the number of print copies, together with print instructions and image information concerning electronic documents. The storage unit 90 includes a storage device, such as a hard disk, and stores therein various data, such as log data, and a control program.

In this exemplary embodiment, a description will be given, assuming that a control program of the density correction processing, which will be discussed later, is stored in the storage unit 90 in advance. The control program is read and executed by the CPU 100A. The control program may be stored in another storage device, such as the ROM 100B. In this exemplary embodiment, the storage unit 90 stores therein, in advance, various thresholds, such as a threshold concerning a variation in the amounts of reflected light components $V_{clean}$, which will be discussed later, and image information concerning a density detection image group including an array of plural patch images.

Various drives may be connected to the controller 100. Various drives are devices that read and write data from and into computer-readable portable recording media, such as flexible disks, magneto-optical discs, compact disc (CD)-ROMs. If various drives are provided, a control program may be recorded on a portable recording medium, and may be read and executed by using a drive corresponding to the portable recording medium.

Density Detection Images

Density detection images will be discussed below.

Figure 4:
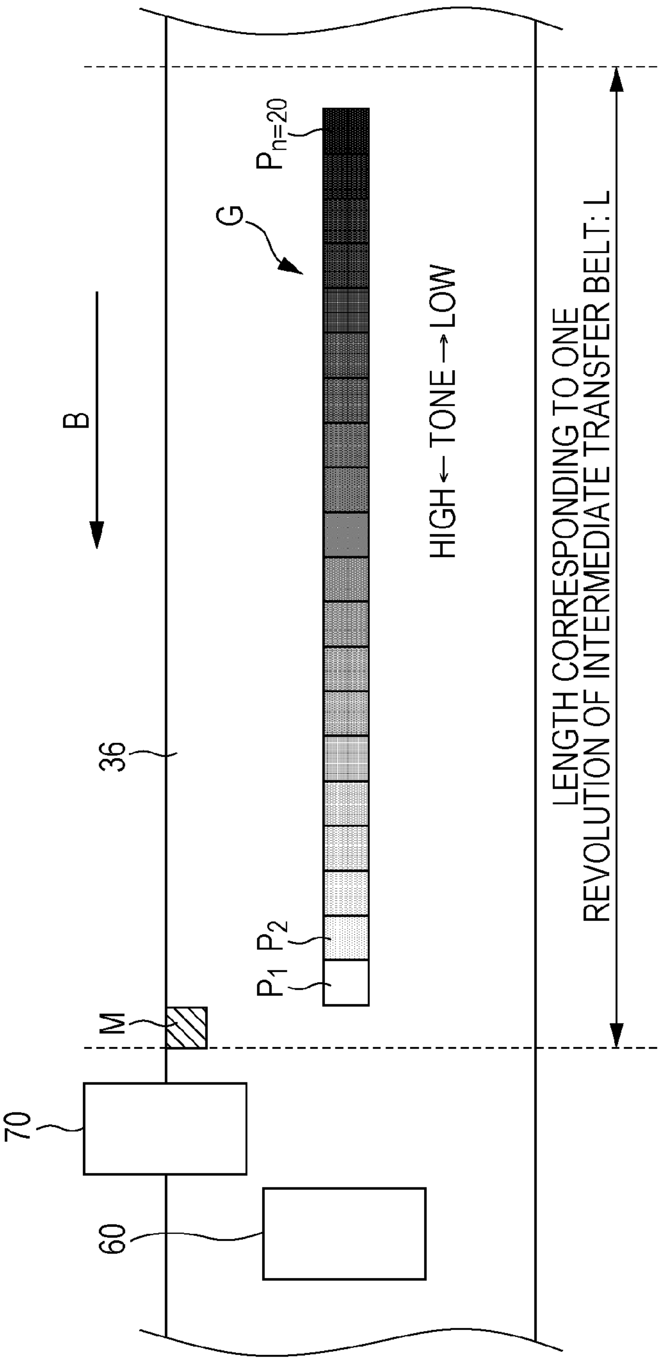
FIG. 4 schematically illustrates an example of plural density detection images formed on an image carrier.

FIG. 4 schematically illustrates an example of plural density detection images formed on an image carrier. As shown in FIG. 4, the density detection image group G includes plural density detection images P (hereinafter referred to as "patch images $P_1$ through $P_n$"). The plural patch images $P_1$ through $P_n$ are toner images formed of one specific color, e.g., K. In this exemplary embodiment, a case in which K patch images $P_1$ through $P_n$ are used will be discussed. The patch images $P_1$ through $P_n$ will be simply referred to as "patch images P" unless it is necessary to distinguish between them.

The plural patch images $P_1$ through $P_n$ are formed linearly on the intermediate transfer belt 36 in the direction in which the intermediate transfer belt 36 is moved (in the direction indicated by the arrow B in FIG. 4). That is, an image group including an array of the plural patch images $P_1$ through $P_n$ is the density detection image group G. Generally, the density detection image group G is formed such that it is contained within a length L corresponding to one revolution of the intermediate transfer belt 36. The length L corresponding to one revolution of the intermediate transfer belt 36 is specified by the reference mark M on the intermediate transfer belt 36.

One patch image P is an image formed at a predetermined ratio of the area of the image to a predetermined area. In this exemplary embodiment, the plural patch images $P_1$ through $P_n$ have different area ratios. The plural patch images $P_1$ through $P_n$ are aligned such that the area ratios are increased or decreased in the direction in which plural patch images $P_1$ through $P_n$ are aligned. The area ratio of the patch image P is represented by a toner coverage ratio per unit area, e.g., 60%. When the coverage ratio is 100%, the patch image P is a solid color image. When the area ratio is 0%, the patch image P is colorless.

In this example, the density detection image group G includes twenty patch images $P_1$ through $P_{20}$ aligned from the left side to the right side of FIG. 4. The area ratios of the twenty patch images $P_1$ through $P_{20}$ are increased monotonically from 0% to 100%. Since the area ratios of the plural patch images P are changed in a stepwise manner, they may be referred to as "tone levels" or "tone values".

When the intermediate transfer belt 36 is moved in the direction indicated by the arrow B shown in FIG. 4, the position detector 70 detects the reference mark M on the intermediate transfer belt 36, thereby detecting a predetermined reference position. The light amount detector 60 detects the amount of light reflected by the density detection image group G formed on the intermediate transfer belt 36. More specifically, the light amount detector 60 detects the amounts of reflected light components $V_{patch}$ in the order in which the plural patch images P are aligned on the downstream to upstream side in the movement direction of the intermediate transfer belt 36. Additionally, on the basis of the measured amounts of reflected light components $V_{patch}$, image density levels $D_{patch}$ of the associated patch images P are obtained. Density correction, such as tone correction, is performed by using plural image density levels $D_{patch\ 1}$ through $D_{patch\ n}$ obtained for the plural patch images $P_1$ through $P_n$, respectively, having different area ratios.

The amounts of reflected light components detected by the light amount detector 60 vary due to various factors, such as differences in individual optical sensors, the state in which an optical sensor is installed, the presence of an unclean area in the optical path of the optical sensor, and temperature characteristics of the optical sensor. Additionally, the amounts of reflected light components detected by the light amount detector 60 vary in accordance with the area ratios of the patch images P. Generally, a variation in the amounts of reflected light components due to the above-described factors is corrected by using the amount of light $V_{clean}$ reflected by the image carrier as a reference value. However, if there is any defective portion on the surface of the image carrier, the amount of reflected light $V_{clean}$, which is a reference value, is changed, which makes it difficult to obtain the correct image density levels $D_{patch}$.

Figure 5A:
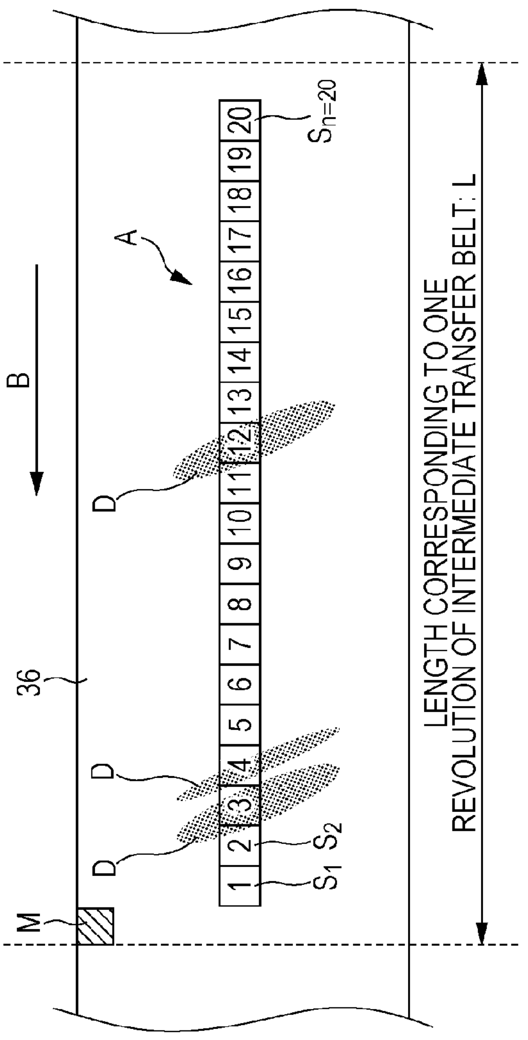
FIG. 5A is a plan view illustrating the relationship between defective portions on the surface of an image carrier and positions of regions at which plural density detection images are formed (image forming regions)

FIG. 5A is a plan view illustrating the relationship between defective portions on the surface of the image carrier and positions of regions at which plural density detection images are formed (hereinafter such regions will be referred to as "image forming regions"). As shown in FIG. 5A, an area A in which the density detection image group G is formed is constituted of plural image forming regions $S_1$ through $S_n$ corresponding to the plural patch images $P_1$ through $P_n$, respectively. The plural image forming regions $S_1$ through $S_n$ are sequentially numbered on the downstream to upstream side in the movement direction of the intermediate transfer belt 36. The plural image forming regions $S_1$ through $S_n$ will be referred to as the "image forming region S" unless it is necessary to distinguish between them.

In this example, the plural image forming regions S are assigned numbers 1 to 20. That is, the area A is constituted of the twenty image forming regions $S_1$ through $S_{20}$ aligned from the left side to the right side of FIG. 5A, and the first image forming region is the image forming region $S_1$. Hereinafter, the positions of the image forming regions S will be specified by the numbers.

As shown in FIG. 5A, there are plural defective portions D on the surface of the intermediate transfer belt 36, which serves as the image carrier. Such defective portions are generated due to various reasons. For example, flaws may occur on the surface of the image carrier over time, chemical substances generated in the image forming apparatus may become attached to the surface of the image carrier, causing the occurrence of stains, or if the image carrier is a belt wound on plural rollers, the belt may be deflected depending on the tension applied to the belt, thereby causing wrinkles or cockles on the surface of the belt. In this example, defective portions D overlap the image forming regions $S_3$, $S_4$, $S_{12}$, and $S_{13}$.

Figure 5B:
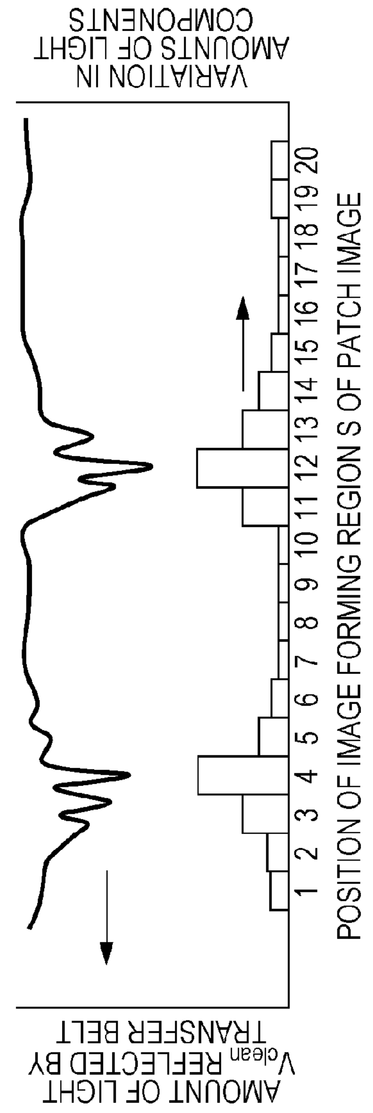
FIG. 5B is a graph illustrating the relationship between the positions of image forming regions shown in FIG. 5A and the amounts of reflected light components obtained at the positions of the image forming regions and variations in the amounts of reflected light components.

FIG. 5B is a graph illustrating the relationship between the positions of image forming regions S shown in FIG. 5A and the amounts of reflected light components obtained at the positions of the image forming regions S and variations in the amounts of reflected light components. The horizontal axis indicates the position (number) of the image forming region S. The vertical axis on the left side indicates the amount of light (reference value $V_{clean}$) reflected by the intermediate transfer belt 36, and the vertical axis on the right side represents a variation in the amounts of light components reflected by the intermediate transfer belt 36. As shown in FIG. 5B, the measurement results of the amounts of light components reflected by the intermediate transfer belt 36 show that the amount of reflected light sharply fluctuates in an image forming region S which overlaps a defective portion D, such as in the image forming region $S_3$, as indicated by the solid lines in FIG. 5B, and that a variation in the amounts of reflected light components increases, as indicated by a bar chart. As described above, if the amount of reflected light $V_{clean}$, which is a reference value, is changed, the correct image density levels $D_{patch}$ are not obtained.

The "variation in amounts of reflected light components" refers to a variation in amounts of plural reflected light components measured in one image forming region. The value representing the "variation in amounts of reflected light components" may be any value representing an amount of a variation in amounts of plural reflected light components. For example, the variation in the amounts of reflected light components may be represented by the difference (fluctuation range) between the maximum value and the minimum value of the measured amounts of plural reflected light components, or by the standard deviation of the measured amounts of plural reflected light components. Alternatively, the average of the measured amounts of plural reflected light components may be calculated, and the variation in the amounts of reflected light components may be represented by the sum of the absolute values of the differences between the amounts of plural reflected light components and the average.

Among the above-described evaluation values representing the variation in the amounts of reflected light components, the difference (fluctuation range) between the maximum value and the minimum value of the measured amounts of plural reflected light components is easier to obtain than the other evaluation values. On the other hand, the other evaluation values represent the variation in the amounts of reflected light components more precisely. In this exemplary embodiment, the amounts of reflected light components at twenty points of each image forming region are measured, and the fluctuation range among the twenty points is set as the "variation in the amounts of reflected light components".

Generally, K does not reflect infrared light, and thus, in K density detection images, light regularly reflected by an image carrier is measured, and the image density is detected on the basis of a decrease in the regular reflected light. Accordingly, in the K density detection images, if there is any defective portion on the surface of an image carrier, it is likely that the amount of reflected light varies. Additionally, in the K density detection images, as the area ratios of the density detection image decrease, the toner coverage ratio on the surface of the image carrier becomes smaller, and a variation in the amounts of reflected light components detected from the K density detection images increases.

For example, in the density detection image group G shown in FIG. 4, the patch image P having a smaller area ratio is more likely to be influenced by the state of the surface of the intermediate transfer belt 36, and thus, the patch image $P_1$ having an area ratio of 0% is most likely to be influenced by the state of the surface of the intermediate transfer belt 36. Accordingly, if the patch image P having a small area ratio is formed in a defective portion D on the surface of the intermediate transfer belt 36, the amounts of reflected light components $V_{patch}$ reflected by the patch images P vary, which makes it difficult to obtain the correct image density levels $D_{patch}$.

Density Correction Processing

Density correction processing will now be described below.

In the image forming apparatus, density correction processing is started when predetermined conditions are satisfied. During the execution of density correction processing, a normal image forming operation is not performed. In this exemplary embodiment, the number of image forming operations is counted, and when the number of image forming operations exceeds a restricted number, density correction processing is started. The conditions for starting density correction processing may be other conditions. For example, when a predetermined period has elapsed, density correction processing may be started.

Figure 6:
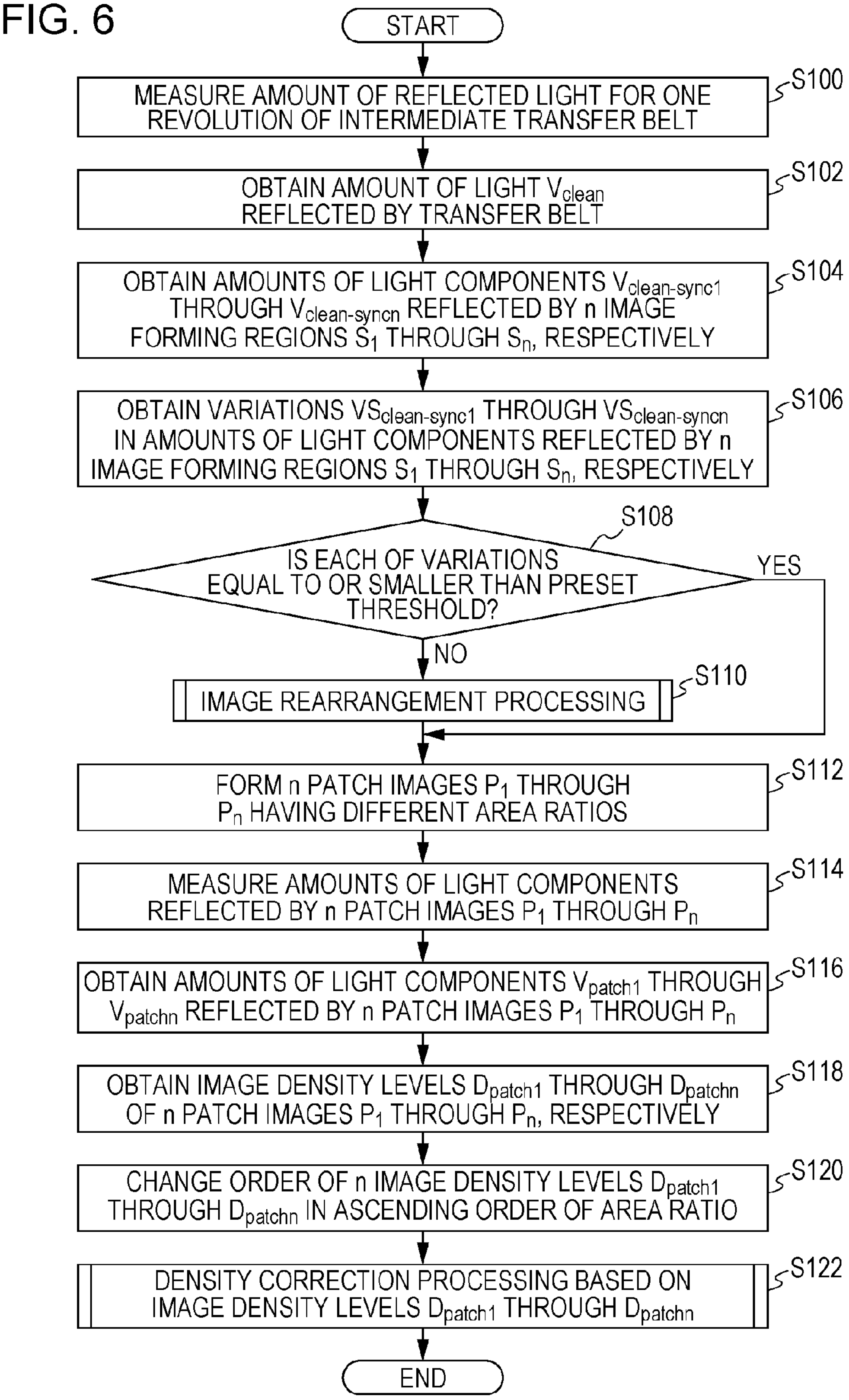
FIG. 6 is a flowchart illustrating a processing routine of density correction processing.
Figure 7:
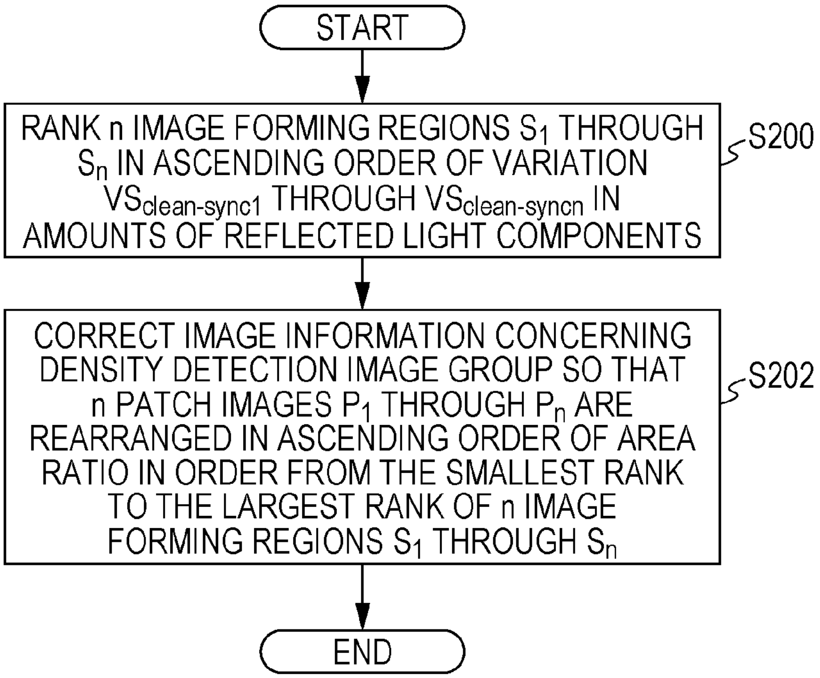
FIG. 7 is a flowchart illustrating a processing routine of image rearrangement processing.

FIG. 6 is a flowchart illustrating a processing routine of density correction processing. FIG. 7 is a flowchart illustrating a processing routine of image rearrangement processing. The density correction processing, and the image rearrangement processing, which is a subroutine of the density correction processing, are executed by the CPU 100A of the controller 100. In this density correction processing, the order in which plural density detection images having different area ratios are disposed is rearranged so that density detection images having area ratios which are smaller than a preset threshold (first threshold) will be formed in image forming regions S, variations in the amounts of light components reflected by such image forming regions S being equal to or smaller than a preset threshold (second threshold). As a result, the correct density levels of density detection images are detected.

In this exemplary embodiment, as shown in FIG. 4, the density detection image group G includes n patch images $P_1$ through $P_n$ having different area ratios. The area ratio of the patch image $P_1$ is 0%, which is the lowest, and the area ratio of the patch image $P_{n=20}$ is 100%, which is the highest. By changing the arrangement order of the plural patch images $P_1$ through $P_n$, patch images having low area ratios, such as the patch image $P_1$, which are likely to be influenced by the state of the surface of the intermediate transfer belt 36, are not formed in defective portions D on the surface of the intermediate transfer belt 36. With this arrangement, correct image density levels $D_{patch\ 1}$ through $D_{patch\ n}$ of the n patch images $P_1$ through $P_n$, respectively, can be detected.

The procedure for the density correction processing will be described below more specifically.

In step S100, the controller 100 instructs the light amount detector 60 to measure the amount of light reflected by the intermediate transfer belt 36 corresponding to a length of one revolution of the intermediate transfer belt 36. As during the execution of an image forming operation, the intermediate transfer belt 36 is moving in the direction indicated by the arrow B shown in FIG. 4 at a predetermined speed. While the intermediate transfer belt 36 is rotating through one revolution, the light amount detector 60 measures the amount of light reflected by the intermediate transfer belt 36. The light amount detector 60 then outputs a detection signal representing an amount of reflected light to the controller 100.

In step S102, the amount of light $V_{clean}$ reflected by the intermediate transfer belt 36 corresponding to one revolution of the intermediate transfer belt 36 is obtained. In the subsequent steps, obtained information is stored in a storage device, such as the RAM 100C, and is used when necessary.

In step S100, the amount of reflected light $V_{clean}$ for one revolution of the intermediate transfer belt 36 is measured, as indicated by the solid lines shown in FIG. 5B.

Then, in step S104, the amounts of light components $V_{clean\text{-}sync1}$ through $V_{clean\text{-}syncn}$ reflected by the image forming regions $S_1$ through $S_n$, respectively, of the n patch images are obtained. In this exemplary embodiment, the amounts of reflected light components at twenty points within the i-th image forming region $S_i$ are measured, and the average of the twenty measurement values is set as the amount of light $V_{clean\text{-}synci}$ reflected by the image forming region $S_i$. Although in this exemplary embodiment the average of the measurement values is used as the amount of light $V_{clean\text{-}synci}$, any representative value of plural measurement values may be used, for example, the median or the mode may be used as the amount of light $V_{clean\text{-}synci}$.

The amounts of light components $V_{clean\text{-}sync1}$ through $V_{clean\text{-}syncn}$ are amounts of light components reflected by the intermediate transfer belt 36 at the same position one revolution before n patch images $P_1$ through $P_n$ are formed on the intermediate transfer belt 36. As will be discussed below, since the order of the n patch images $P_1$ through $P_n$ is changed, the patch image P having the i-th highest area ratio will not be necessarily formed in the i-th image forming region $S_i$. The amounts of light components $V_{clean\text{-}sync1}$ through $V_{clean\text{-}syncn}$ are used as reference values when correcting the amounts of reflected light components detected by the light amount detector 60.

Then, in step S106, variations $VS_{clean\text{-}sync1}$ through $VS_{clean\text{-}syncn}$ in the amounts of light components $V_{clean\text{-}sync1}$ through $V_{clean\text{-}syncn}$, respectively, reflected by the image forming regions $S_1$ through $S_n$, respectively, of the n patch images are obtained. In this exemplary embodiment, the amounts of light components at twenty points within the i-th image forming region $S_i$ are measured, and the fluctuation range (difference between the maximum value and the minimum value) among the twenty measured values is set as the variation $VS_{clean\text{-}synci}$ in the amounts of reflected components within the image forming region $S_i$.

Then, in step S108, it is determined whether each of the variations $VS_{clean\text{-}sync1}$ through $VS_{clean\text{-}syncn}$ in the amounts of light components $V_{clean\text{-}sync1}$ through $V_{clean\text{-}syncn}$, respectively, is equal to or smaller than a preset threshold (third threshold). The third threshold is larger than the second threshold. The individual thresholds are stored in advance in a storage device, such as the storage unit 90, and are read from the storage device and are used when necessary. If the result of step S108 is NO, it means that there is an image forming region S that overlaps a defective portion D of the intermediate transfer belt 36. The process then proceeds to step S110. In step S110, image rearrangement processing for changing the arrangement order of the n patch images $P_1$ through $P_n$ is executed.

By executing the image rearrangement processing, image information concerning the density detection image group G including n patch images $P_1$ through $P_n$ which are arranged in ascending order of area ratio is corrected. Details of the image rearrangement processing will be given later. In contrast, if the result of step S108 is YES, it means that there is no image forming region S which overlaps a defective portion D of the intermediate transfer belt 36. Then process then proceeds to step S112 by skipping step S110. That is, the execution of the image rearrangement processing is omitted.

In step S112, the controller 100 instructs the image forming unit 30 to form n patch images $P_1$ through $P_n$ having different area ratios. Then, n patch images $P_1$ through $P_n$ whose order has been changed in step S110 are formed on the intermediate transfer belt 36 by the image forming unit 30 on the basis of a position detection signal output from the position detector 70, which serves as a reference to starting an image forming operation.

Then, in step S114, the controller 100 instructs the light amount detector 60 to detect the amounts of light components reflected by the n patch images $P_1$ through $P_n$ formed on the intermediate transfer belt 36. The light amount detector 60 measures the amounts of light components reflected by the n patch images $P_1$ through $P_n$ while the intermediate transfer belt 36 is rotating through one revolution. The light amount detector 60 outputs a detection signal representing the measured amounts of light components to the controller 100. Accordingly, in step S116, the controller 100 obtains the amounts of light components $V_{patch1}$ through $V_{patchn}$ reflected by the n patch images $P_1$ through $P_n$, respectively.

Then, in step S118, image density levels $D_{patch1}$ through $D_{patchn}$ of the n patch images $P_1$ through $P_n$, respectively, are obtained according to the following equation (1). Equation (1) is a relational expression for obtaining the image density level $D_{patchi}$ of the patch image P formed in the i-th image forming region $S_i$. $K_{std}$ is a normalized coefficient, i.e., a coefficient for rounding division results to integers (0 through 255, 0 through 1023, etc.).

$$D_{patchi}=V_{patchi}/V_{clean\text{-}synci}\times K_{std} \quad (1)$$

Then, in step S120, the order of the obtained n image density levels $D_{patch1}$ through $D_{patchn}$ is changed in ascending order of area ratios of the patch images P. Before the execution of the image rearrangement processing, the n patch images $P_1$ through $P_n$ were disposed in ascending order of area ratio. After the execution of the image rearrangement processing, the arrangement order of the n patch images $P_1$ through $P_n$ has been changed. Accordingly, the order of the obtained n image density levels $D_{patch1}$ through $D_{patchn}$ is changed in ascending order of area ratio in step S120.

Then, in step S122, density correction processing, such as tone correction, is executed on the basis of the obtained n image density levels $D_{patch1}$ through $D_{patchn}$. After step S122, the routine is completed. If tone correction is executed, it is executed on the basis of the area ratio and the image density $D_{patchi}$ the i-th patch image $P_i$ so that an input tone value (area ratio of the patch image $P_i$) and an output tone value when the patch images P were formed have a predetermined relationship.

Image Rearrangement Processing

The image rearrangement processing executed in step S110 will be discussed below with reference to the flowchart of FIG. 7. In step S200, the n image forming regions $S_1$ through $S_n$ are numbered (ranked) in ascending order of variation $VS_{clean\text{-}sync1}$ through $VS_{clean\text{-}syncn}$ of the amounts of reflected light components. Then, in step S202, image information concerning the density detection image group G in which plural patch images P are arranged is corrected in order to rearrange the order of the n patch images $P_1$ through $P_n$. That is, in order from the smallest number (rank) to the largest number (rank) of the n image forming regions $S_1$ through $S_n$, the n patch images $P_1$ through $P_n$ are rearranged in ascending order of area ratio. Then, the subroutine of step S110 is completed.

Figure 9:
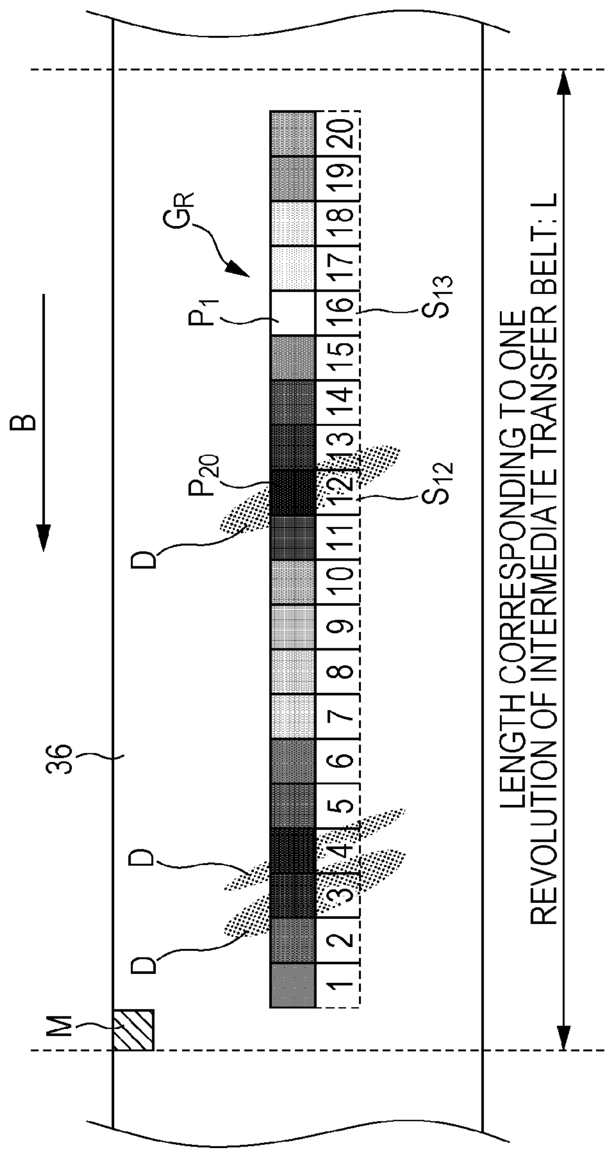
FIG. 9 schematically illustrates an example of plural density detection images after executing image rearrangement processing.

FIG. 8 illustrates a table indicating the arrangement order of plural density detection images before and after executing the image rearrangement processing. FIG. 9 schematically illustrates an example of plural density detection images after executing image rearrangement processing. Before executing the image rearrangement processing in step S110 of FIG. 6, the density detection image group G includes twenty patch images $P_1$ through $P_{20}$, as shown in FIG. 4.

In the table shown in FIG. 8, as indicated by the column "original area ratio of patch image", before executing the image rearrangement processing, the twenty patch images $P_1$ through $P_{20}$ are disposed in ascending order of area ratio. That is, the twenty patch images $P_1$ through $P_{20}$ are disposed in association with the twenty image forming regions $S_1$ through $S_{20}$, respectively, so that the i-th patch image $P_i$ is formed in the i-th image forming region $S_i$.

As indicated by the column "variation in the reference values" in the table and as shown in FIG. 9, variations in the amounts of light components reflected by the twenty image forming regions $S_1$ through $S_{20}$ are increased in the image forming regions that overlap defective portions D, such as the image forming regions $S_3$, $S_4$, $S_{12}$, and $S_{13}$. As indicated by the column "rank (number) of variations" of the table, the twenty image forming regions $S_1$ through $S_{20}$ are numbered (ranked) in ascending order of variation in the amounts of reflected light components. In this example, the first rank is given to the image forming region $S_{16}$ having the smallest variation in the reflected light components, while the twentieth rank is given to the image forming region $S_{12}$ having the largest variation in the reflected light components.

As indicated by the column "area ratios of patch images after executing image rearrangement processing" in the table, in order from the smallest number (rank) to the largest number (rank) of the twenty image forming regions $S_1$ through $S_{20}$, the twenty patch images $P_1$ through $P_{20}$ are rearranged in ascending order of area ratio. As a result, after executing the image rearrangement processing, as shown in FIG. 9, a density detection image group $G_R$ in which the arrangement order of the n patch images $P_1$ through $P_{20}$ has been changed is formed in the area A (see FIG. 5A) of the intermediate transfer belt 36.

Since the arrangement order of the n patch images $P_1$ through $P_{20}$ has merely been changed, the length of the density detection image group $G_R$ is equal to that of the image detection image group G before executing the image rearrangement processing. Additionally, the time taken to form the density detection image group $G_R$ is equal to that of the image detection image group G before executing the image rearrangement processing.

In the density detection image group $G_R$, patch images P having small area ratios are not formed in image forming regions S that overlap defective portions D, i.e., in image forming regions S having large variations in the amounts of reflected light components. For example, the patch image $P_1$ having an area ratio of 0%, which is likely to be influenced by the state of the surface of the intermediate transfer belt 36, is formed in the image forming region $S_{16}$ having the smallest variation in the amounts of reflected light components. On the other hand, the patch image $P_{20}$ having an area ratio of 100%, which is less likely to be influenced by the state of the surface of the intermediate transfer belt 36, is formed in the image forming region $S_{12}$ having the largest variation in the amounts of reflected light components.

As described above, in this exemplary embodiment, in order from the smallest variation to the largest variation in the amounts of light components reflected by plural image forming regions S, the arrangement order of plural patch images P is changed in ascending order of area ratio. With this arrangement, concerning each of plural patch images P, the image density $D_{patch}$ of the patch image P is effectively corrected by using the amount of light $V_{clean}$ (reference value) reflected by the image forming region S in which the patch image P is to be formed. As a result, the patch images P having area rations which are equal to or smaller than a preset threshold (first threshold) are formed in image forming regions S having variations in the amounts of reflected light components which are equal to or smaller than a preset threshold (second threshold).

First Modified Example of Image Rearrangement Processing

In the above-described exemplary embodiment, plural patch images P are rearranged in ascending order of area ratio, in order from the smallest variation to the largest variation in the amounts of light components reflected by plural image forming regions S. However, image rearrangement processing may be executed in another manner. For example, patch images P having area ratios which are equal to or smaller than a preset threshold (first threshold) may be formed in image forming regions S having small variations in the amounts of reflected light components.

Figure 10:
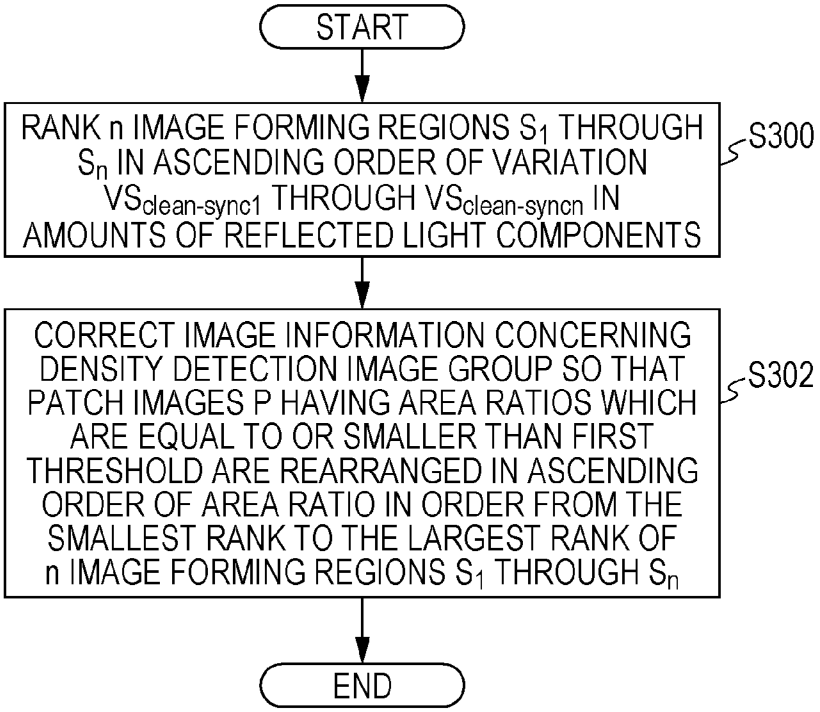
FIG. 10 is a flowchart illustrating image rearrangement processing of a first modified example.
Figure 12:
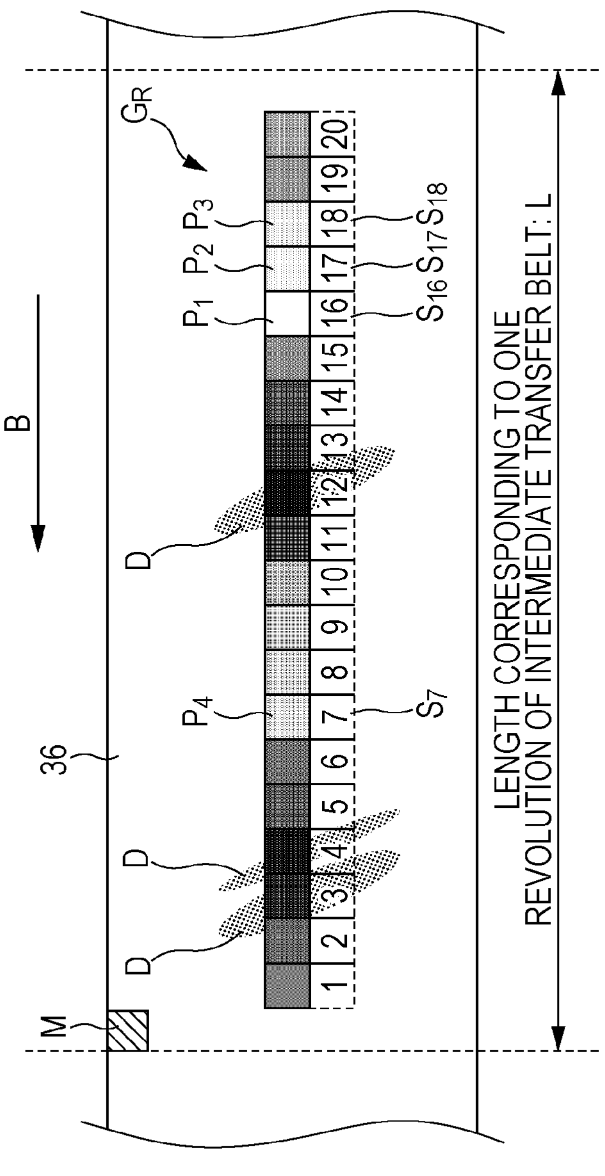
FIG. 12 schematically illustrates another example of plural density detection images after executing image rearrangement processing.

FIG. 10 is a flowchart illustrating image rearrangement processing of a first modified example. FIG. 11 illustrates a table indicating the arrangement order of plural density detection images before and after executing image rearrangement processing. FIG. 12 schematically illustrates another example of plural density detection images after executing image rearrangement processing.

In image rearrangement processing shown in FIG. 10, in step S300, n image forming regions $S_1$ through $S_n$ are numbered (ranked) in ascending order of variation $VS_{clean\text{-}sync1}$ through $VS_{clean\text{-}syncn}$ in the amounts of reflected light components. In step S302, patch images P having area ratios which are equal to or smaller than a first threshold are set to be subjects which will be rearranged. Then, image information concerning the density detection image group G in which plural patch images P are arranged is corrected in order to change the arrangement order of the subject patch images P. That is, in order from the smallest rank to the largest rank of the n image forming regions $S_1$ through $S_n$, the subject patch images P are rearranged in ascending order of area ratio. Then, the subroutine is completed.

In the table shown in FIG. 11, as in the table shown in FIG. 8, twenty image forming regions $S_1$ through $S_{20}$ are numbered (ranked) in ascending order of variation in the amounts of reflected light components. In the first modified example, the first threshold concerning the area ratio of the patch image P is, for example, 25%. In the example shown in FIG. 11, patch images $P_1$ through $P_4$ having area ratios of 25% or smaller, as indicated by the shaded portions, are set to be subjects which will be rearranged. As indicated by the column "area ratios of patch images after executing image rearrangement processing" in the table, in order from the smallest rank to the larger rank of the twenty image forming regions $S_1$ through $S_{20}$, the four patch images $P_1$ through $P_4$ are rearranged in ascending order of area ratio.

More specifically, the patch image $P_1$ having an area ratio of 0% is formed in the image forming region $S_{16}$ having the smallest variation in the amounts of reflected light components. Instead, the patch image $P_{16}$ having an area ratio of 80.1% is formed in the image forming region $S_1$. Additionally, the patch image $P_2$ having an area ratio of 10.2% is formed in the image forming region $S_{17}$ having the second smallest variation in the amounts of reflected light components. Instead, the patch image $P_{17}$ having an area ratio of 85.0% is formed in the image forming region $S_2$.

The patch image $P_3$ having an area ratio of 15.2% is formed in the image forming region $S_{18}$ having the third smallest variation in the amounts of reflected light components. Instead, the patch image $P_{18}$ having an area ratio of 90.0% is formed in the image forming region $S_3$. Additionally, the patch image $P_4$ having an area ratio of 20.2% is formed in the image forming region $S_7$ having the fourth smallest variation in the amounts of reflected light components. Instead, the patch image $P_7$ having an area ratio of 35.2% is formed in the image forming region $S_4$.

As a result, after executing image rearrangement processing, as shown in FIG. 12, a density detection image group $G_R$ in which the arrangement order of some patch images P has been changed is formed in the area A (see FIG. 5A) of the intermediate transfer belt 36. In the first modified example, among the twenty patch images P, the arrangement order of eight patch images P is changed. In the density detection image group $G_R$, patch images P having area ratios which are equal to or smaller than the first threshold are formed in image forming regions S having small variations in the amounts of reflected light components.

Second Modified Example of Image Rearrangement Processing

Figure 13:
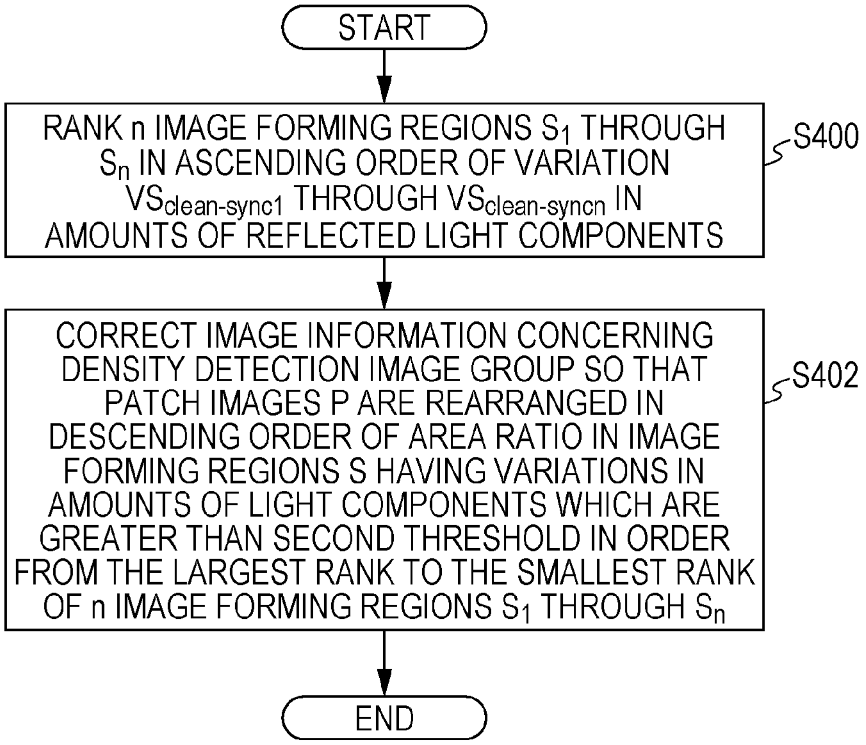
FIG. 13 is a flowchart illustrating image rearrangement processing of a second modified example.
Figure 15:
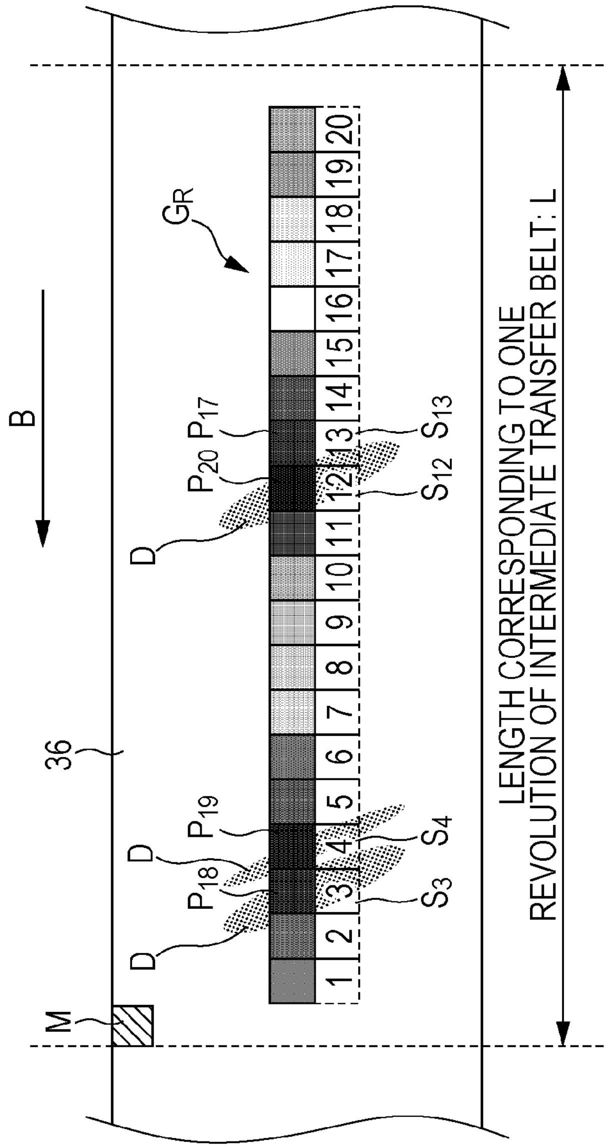
FIG. 15 schematically illustrates still another example of plural density detection images after executing image rearrangement processing.

Alternatively, patch images P having large area ratios may be formed in image forming regions S having variations in the amounts of reflected light components which are greater than a preset threshold (second threshold). FIG. 13 is a flowchart illustrating image rearrangement processing of a second modified example. FIG. 14 illustrates a table indicating the arrangement order of plural density detection images before and after executing image rearrangement processing. FIG. 15 schematically illustrates still another example of plural density detection images after executing image rearrangement processing.

In image rearrangement processing shown in FIG. 13, in step S400, n image forming regions $S_1$ through $S_n$ are numbered (ranked) in ascending order of variation $VS_{clean\text{-}sync1}$ through $VS_{clean\text{-}syncn}$ in the amounts of reflected light components. In step S402, image forming regions S having variations in the amounts of light components which are greater than the second threshold are set to be subjects which will be rearranged. Then, image information concerning the density detection image group G in which plural patch images P are arranged is corrected in order to change the arrangement order of the subject image forming regions S. That is, in order from the largest rank to the smallest rank of the n image forming regions $S_1$ through $S_n$, the plural patch images P are rearranged in descending order of area ratio. Then, the subroutine is completed.

In the table shown in FIG. 14, as in the table shown in FIG. 8, twenty image forming regions $S_1$ through $S_{20}$ are numbered (ranked) in ascending order of variation in the amounts of reflected light components. In the second modified example, the second threshold concerning a variation in the amounts of light components, for example, 1.00. In the example shown in FIG. 14, image forming regions $S_3$, $S_4$, $S_{12}$, and $S_{13}$, having a variation in the amounts of light components of 1.00 or greater, as indicated by the shaded portions, are set to be subjects which will be rearranged. As indicated by the column "area ratios of patch images after executing image rearrangement processing" in the table, in order from the largest (i.e., twentieth) rank to the smallest rank of the twenty image forming regions $S_1$ through $S_{20}$, the four patch images $P_{17}$ through $P_{20}$ are rearranged in descending order of area ratio.

More specifically, the patch image $P_{20}$ having an area ratio of 100% is formed in the image forming region $S_{12}$ having the largest variation in the amounts of reflected light components. Instead, the patch image $P_{12}$ having an area ratio of 60.1% is formed in the image forming region $S_{20}$. Additionally, the patch image $P_{19}$ having an area ratio of 95.0% is formed in the image forming region $S_4$ having the second largest variation in the amounts of reflected light components. Instead, the patch image $P_4$ having an area ratio of 20.2% is formed in the image forming region $S_{19}$.

The patch image $P_{18}$ having an area ratio of 90.0% is formed in the image forming region $S_3$ having the third largest variation in the amounts of reflected light components. Instead, the patch image $P_3$ having an area ratio of 15.2% is formed in the image forming region $S_{18}$. Additionally, the patch image $P_{17}$ having an area ratio of 85.0% is formed in the image forming region $S_{13}$ having the fourth largest variation in the amounts of reflected light components. Instead, the patch image $P_{13}$ having an area ratio of 65.1% is formed in the image forming region $S_{17}$.

As a result, after executing image rearrangement processing, as shown in FIG. 15, a density detection image group $G_R$ in which the arrangement order of some patch images P has been changed is formed in the area A (see FIG. 5A) of the intermediate transfer belt 36. In the third modified example, among the twenty patch images P, the arrangement order of eight patch images P is changed. In the density detection image group $G_R$, patch images P having large area ratios are formed in image forming regions S having variations in the amounts of reflected light components which are greater than the second threshold.

Third Modified Example of Image Rearrangement Processing

Alternatively, a threshold (fourth threshold) concerning a variation in the amounts of light components reflected by the image forming region S may be set for each of the area ratios of the patch images P. In this case, the arrangement order of plural patch images P is changed so that the patch images P will be formed in image forming regions S having set fourth thresholds or smaller in accordance with the area ratios of the patch images P. In the third modified example, it is possible to reliably change the order of patch images P which are necessary to be rearranged.

The configurations of the density detection apparatus and the image forming apparatus discussed in the above-described exemplary embodiment and first through third modified examples are only examples, and may be changed without departing from the spirit of the invention. For example, the image carrier may be replaced by a drum, and the orders of step numbers of the individual flowcharts may be changed.

The foregoing description of the exemplary embodiment and the modified examples of the present invention has been provided for the purposes of illustration and description. It is not intended to be exhaustive or to limit the invention to the precise forms disclosed. Obviously, many modifications and variations will be apparent to practitioners skilled in the art. The embodiment and the modified examples chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A density detection apparatus comprising:

a storage unit that stores therein image information concerning a plurality of density detection images having different area ratios and being linearly arranged in a predetermined order;

a measuring unit that measures amounts of light components reflected by an image carrier or by the plurality of density detection images formed on the image carrier;

a light amount obtaining unit that obtains a variation in amounts of light components reflected by each of a plurality of regions in which the plurality of associated density detection images are formed, on the basis of values of the measured amounts of light components reflected by the image carrier, and that obtains, as a reference value, a representative value of the amounts of light components reflected by each of the plurality of regions;

an image correcting unit that corrects the image information stored in the storage unit by changing an arrangement order of the plurality of density detection images so that density detection images having area ratios which are equal to or smaller than a first threshold are to be formed in regions having variations in the amounts of light components which are equal to or smaller than a second threshold;

an image forming unit that forms the plurality of density detection images on the image carrier on the basis of the corrected image information; and a density obtaining unit that obtains image density levels for the plurality of density detection images corresponding to the area ratios of the plurality of density detection images by using the amounts of light components reflected by the plurality of density detection images and the reference values set for the plurality of regions in which the plurality of associated density detection images are formed.

2. The density detection apparatus according to claim 1, wherein the image correcting unit corrects the image information stored in the storage unit if at least one of the plurality of regions has a variation in the amounts of light components which is equal to or greater than a third threshold.

3. The density detection apparatus according to claim 1, wherein the image correcting unit changes the arrangement order of the plurality of density detection images so that the plurality of density detection images are disposed in ascending order of area ratio in order from the smallest variation to the largest variation in the amounts of light components reflected by the plurality of regions.

4. The density detection apparatus according to claim 2, wherein the image correcting unit changes the arrangement order of the plurality of density detection images so that the plurality of density detection images are disposed in ascending order of area ratio in order from the smallest variation to the largest variation in the amounts of light components reflected by the plurality of regions.

5. The density detection apparatus according to claim 1, wherein the image correcting unit changes the arrangement order of the plurality of density detection images so that, among the plurality of density detection images represented by the image information stored in the storage unit, at least density detection images having area ratios which are equal to or smaller than the first threshold are sequentially disposed in ascending order of area ratio in order from the smallest variation to the largest variation in the amounts of light components reflected by the plurality of regions.

6. The density detection apparatus according to claim 2, wherein the image correcting unit changes the arrangement order of the plurality of density detection images so that, among the plurality of density detection images represented by the image information stored in the storage unit, at least density detection images having area ratios which are equal to or smaller than the first threshold are sequentially disposed in ascending order of area ratio in order from the smallest variation to the largest variation in the amounts of light components reflected by the plurality of regions.

7. The density detection apparatus according to claim 1, wherein the image correcting unit changes the arrangement order of the plurality of density detection images so that, among the plurality of density detection images represented by the image information stored in the storage unit, at least some density detection images are sequentially disposed in descending order of area ratio in at least regions having variations in the amounts of light components which exceed the second threshold, in order from the largest variation to the smallest variation in the amounts of light components reflected by the plurality of regions.

8. The density detection apparatus according to claim 2, wherein the image correcting unit changes the arrangement order of the plurality of density detection images so that, among the plurality of density detection images represented by the image information stored in the storage unit, at least some density detection images are sequentially disposed in descending order of area ratio in at least regions having variations in the amounts of light components which exceed the second threshold, in order from the largest variation to the smallest variation in the amounts of light components reflected by the plurality of regions.

9. The density detection apparatus according to claim 1, wherein the variation in the amounts of light components reflected by each of the plurality of regions is represented by a difference between a maximum value and a minimum value of the amounts of a plurality of light components measured in the corresponding region.

10. The density detection apparatus according to claim 1, wherein the variation in the amounts of light components reflected by each of the plurality of regions is represented by a standard deviation of the amounts of a plurality of light components measured in the corresponding region.

11. The density detection apparatus according to claim 1, wherein, if an average of the amounts of a plurality of light components measured in each of the plurality of regions is obtained, the variation in the amounts of light components reflected by each of the plurality of regions is represented by a sum of absolute values of differences between the amounts of plurality of light components and the average.

12. An image forming apparatus comprising:

an image forming unit that forms images on an image carrier on the basis of image information;

a storage unit that stores therein image information concerning a plurality of density detection images having different area ratios and being linearly arranged in a predetermined order;

a measuring unit that measures amounts of light components reflected by the image carrier or the plurality of density detection images formed on the image carrier;

a light amount obtaining unit that obtains a variation in amounts of light components reflected by each of a plurality of regions in which the plurality of associated density detection images are formed, on the basis of values of the measured amounts of light components reflected by the image carrier, and that obtains, as a reference value, a representative value of the amounts of light components reflected by each of the plurality of regions;

an image correcting unit that corrects the image information stored in the storage unit by changing an arrangement order of the plurality of density detection images so that density detection images having area ratios which are equal to or smaller than a first threshold are to be formed in regions having variations in the amounts of light components which are equal to or smaller than a second threshold;

a density obtaining unit that obtains a plurality of image density levels for the plurality of density detection images corresponding to the area ratios of the plurality of density detection images by using the amounts of light components reflected by the plurality of density detection images and the reference values set for the plurality of regions in which the plurality of associated density detection images are formed; and a density correcting unit that corrects an output image density on the basis of the plurality of image density levels obtained by the density obtaining unit.

13. A density detection method comprising:

measuring amounts of light components reflected by an image carrier or a plurality of density detection images formed on the image carrier;

obtaining a variation in amounts of light components reflected by each of a plurality of regions in which the plurality of associated density detection images are formed, on the basis of values of the measured amounts of light components reflected by the image carrier, and obtaining, as a reference value, a representative value of the amounts of light components reflected by each of the plurality of regions;

correcting image information concerning the plurality of density detection images having different area ratios and being linearly arranged in a predetermined order by changing an arrangement order of the plurality of density detection images so that density detection images having area ratios which are equal to or smaller than a first threshold are to be formed in regions having variations in the amounts of light components which are equal to or smaller than a second threshold;

forming the plurality of density detection images on the image carrier on the basis of the corrected image information; and obtaining image density levels for the plurality of density detection images corresponding to the area ratios of the plurality of density detection images by using the amounts of light components reflected by the plurality of density detection images and the reference values set for the plurality of regions in which the plurality of associated density detection images are formed.

* * * * *